May 31, 1966 M. COOPERMAN 3,254,238

CURRENT STEERING LOGIC CIRCUITS HAVING NEGATIVE RESISTANCE DIODES CONNECTED IN THE OUTPUT BIASING NETWORKS OF THE AMPLIFYING DEVICES

Filed Dec. 23, 1963 2 Sheets-Sheet 1

INVENTOR.
MICHAEL COOPERMAN
BY John V. Regan
ATTORNEY

INVENTOR.
MICHAEL COOPERMAN
BY John V. Regan
ATTORNEY

United States Patent Office 3,254,238
Patented May 31, 1966

3,254,238
CURRENT STEERING LOGIC CIRCUITS HAVING NEGATIVE RESISTANCE DIODES CONNECTED IN THE OUTPUT BIASING NETWORKS OF THE AMPLIFYING DEVICES

Michael Cooperman, Cherry Hill, N.J., assignor to Radio Corporation of America, a corporation of Delaware
Filed Dec. 23, 1963, Ser. No. 332,497
10 Claims. (Cl. 307—88.5)

This invention relates to electrical circuits and, in particular, to logic circuits.

A logic circuit, for present purposes, may be defined as a circuit capable of performing logic operations and closely related operations. Flip-flops, gates and binary comparators are examples of logic circuits. Many of the modern digital computers use transistor-type logic circuits because a transistor can provide amplification at reasonable power levels.

Most transistor logic circuits of the prior art are operated so that the transistor is either cut-off or in saturation. Saturation is undesirable for very high speed operation because the turn-off time of the transistor is increased due to minority carrier storage effects. The turn-on time may also be increased, depending upon the operating history of the transistor.

It has been suggested that saturation may be avoided by using a so-called "current steering pair," in which a substantailly constant current is selectively steered through the transistors under control of an applied input signal or signals. In such an arrangement, the output voltages generally are dependent upon the circuit loading, and may vary with changes in loading. Also, the usual type of current steering pair does not have the inherent storage capability that is necessary in some types of logic circuits, flip-flops for example. Further, the quiescent current from the current source usually flows through only one of the transistors, which may be disadvantageous in some cases. For example, the heat generated in the normally conducting transistor may be enough to change the operating characteristics thereof.

It is one object of this invention to provide improved logic circuits that employ a current steering pair.

It is another object of the invention to provide an improved logic circuit employing a current steering pair in which the output voltages may have either one or the other of two fairly wel-defined values, regardless of the loading on the circuit.

It is still another object of this invention to provide an improved current steering pair in which both of the amplifying devices, such as transistors, conduct in the absence of applied input signals.

It is a further object of this invention to provide an improved current steering pair which has storage capability.

Another object of the invention is to provide an improved "exclusive OR" gate comprising the novel current steering pair.

A logic circuit according to the invention includes a pair of amplifying devices each having input, output and control electrodes. Each input electrode is connected to one terminal of a source of substantially constant current, and each output electrode is connected by way of a different negative resistance device, which may be a tunnel diode, to a second terminal of the current source. The control electrodes are biased so that both amplifying devices conduct in the absence of applied input signals. The source current may be temporarily "steered" through a selected one of the transistors under the control of applied input signals.

The logic circuit may be operated as a flip-flop, for example, by a applying "set" and "reset" pulses at the different control electrodes.

The circuit may be operated as an exclusive OR gate, for example, by applying different logic signals or levels at the control electrodes, and by ORING the outputs at the two output electrodes.

In the accompanying drawing, like reference characters denote like components throughout the several figures, and:

Figure 1:
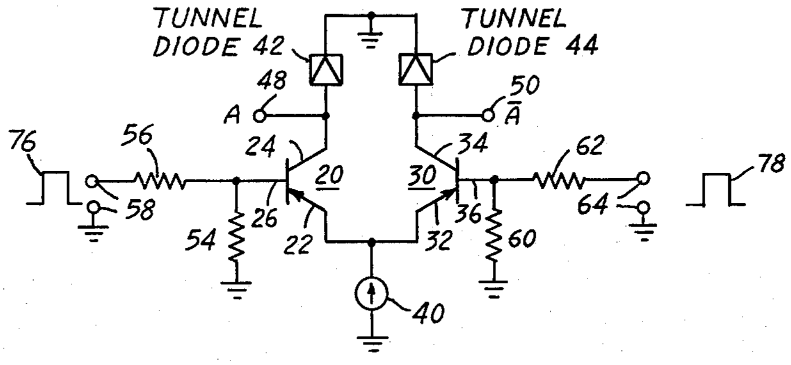
FIGURE 1 is a schematic diagram of a logic circuit according to the invention.

The circuit of FIGURE 1 includes a pair of amplifying devices 20, 30, illustrated as transistors of like conductivity type, namely PNP type. A source 40 of substantially constant current I has one terminal connected in common to the input, or emitter, electrodes 22, 32 of the first and second transistors 20, 30, respectively. The other terminal of the current source 40 is connected to a point of reference potential, indicated by the conventional symbol for circuit ground.

Each output, or collector, electrode 24, 34 is connected to circuit ground by way of a different negative resistance device 42, 44, respectively. The negative resistance devices, which are preferably tunnel diodes, are ones having a volt-ampere characteristic defined by first and second regions of positive resistance, at relatively low and relatively high voltage, respectively, separated by a region of negative resistance. When tunnel diodes are employed as the negative resistance devices, the cathodes thereof are grounded and the anodes are connected to the respective collector electrodes 24, 34 when the transistors are of PNP type.

A first output terminal 48 is connected at the collector electrode 24 of first transistor 20, and a second output terminal 50 is connected at the collector electrode 34 of second transistor 30. The input network for the first transistor 20 comprises a resistor 54 connected between the base electrode 26 and circuit ground. Another resistor 56 is connected between the base electrode 26 and the ungrounded one of a pair of input terminals 58. Second transistor 30 has a resistor 60 connected between its base electrode 36 and ground, and has another resistor 62 connected between the base electrode 36 and the ungrounded one of a pair of input terminals 64.

Figure 2:
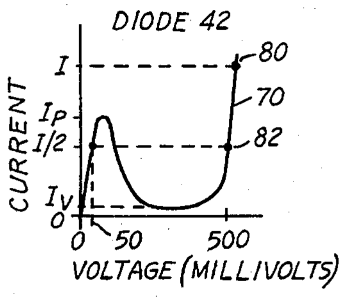
FIGURES 2 and 3 are volt-ampere operating characteristics for the tunnel diodes in the FIGURE 1 circuit.
Figure 3:
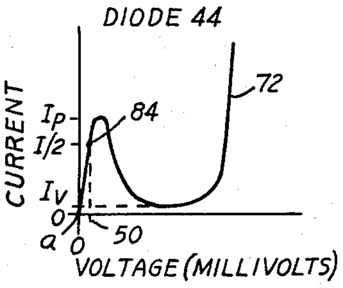

FIGURE 2 is a volt-ampere operating characteristic for tunnel diode 42, and FIGURE 3 is a volt-ampere operating characteristic for the tunnel diode 44. It is assumed for convenience that the diodes 42 and 44 have similar operating characteristics and, for this reason, the operating characteristics 70 and 72 in FIGURES 2 and 3, respectively, are shown as being the same. In actual practice, these characteristics may differ, within limits, without any adverse effect on the circuit operation. What is important is that each of the tunnel diodes 42, 44 have substantially the same low voltage condition and the same high voltage condition (to be described). The current peaks $I_p$ of the two devices preferably are substantially the same. The current supplied by the source 40 is selected to have a value I, where I is greater than the peak current $I_p$ of either tunnel diode 42, 44, and I/2 is less than either peak current $I_p$.

The FIGURE 1 circuit may be operated in different ways to perform different logical operations. For example, the circuit may be operated as a flip-flop in the following manner. Assume that no input signals are applied across the input terminals 58, 64 in the quiescent state of the circuit. The base electrodes 26, 36 then are biased equally, and both of the transistors 20, 30 conduct. Ideally, the current I from source 40 divides equally between the two transistors 20, 30 and the collector current is the same for each transistor. The collector current I/2 in each transistor is less than the peak current $I_p$ of the associated tunnel diode.

Assume now that a positive going input pulse 78 is applied across input terminals 64. This input pulse 78 raises the voltage at base electrode 36 and turns off second transistor 30. All of the current I from source 40 then is steered temporarily into the emitter 22 of first transistor 20. Except for a small base current, the emitter 22 current flows out the collector electrode 24 and through the tunnel diode 42 to ground.

As may be seen in FIGURE 2, the current I is greater than the peak current $I_p$ of tunnel diode 42, whereby tunnel diode 42 is switched through its negative resistance region to an operating point 80 of relatively high voltage. The output voltage A at terminal 48 is approximately +0.5 volt. Little or no current flows through second transistor 30 while the input pulse 78 is present and, accordingly, little or no current flows through the tunnel diode 44. It may be assumed that tunnel diode 44 is biased at the origin (point *a*, FIGURE 3) while the input pulse 78 is present. The output voltage $\overline{A}$ is approximately zero for this condition.

Once the input pulse 78 terminates, both of the base electrodes 26 and 36 are again biased equally, and the current I from source 40 is steered equally to the two transistors 20 and 30. A current I/2 then flows through each of the tunnel diodes 42, 44, neglecting any load connected at the output terminals 48 and 50. The operating point for tunnel diode 42 moves down to the point 82 (FIGURE 2) when the diode current is reduced to I/2. Note, however, that the diode 42 remains in the high voltage state. The operating point for tunnel diode 44 moves up the characteristic curve 72 (FIGURE 3) to the point 84 as the transistor 30 current returns to value I/2. The voltage $\overline{A}$ may increase a slight amount, perhaps 50 millivolts or less, which can be considered zero for practical purposes. Since the output voltages A and $\overline{A}$ remain substantially unchanged when the input signal 78 terminates, it can be seen that the circuit "stores" the input information, even though both transistors 20, 30 are conducting equally in the quiescent condition.

A portion of the collector 24 current may be supplied to loads (not shown) connected at output terminal 48. This, of course, reduces the tunnel diode 42 current to a value less than I/2. As may be seen in FIGURE 2, tunnel diode 42 remains in the high voltage state so long as the diode current exceeds a value $I_v$, whereby a current somewhat less than $$\frac{I}{2}-I_v$$

may be supplied to any connected loads. It will be noticed in FIGURE 2 that the voltage across the tunnel diode 42 remains relatively constant, regardless of load, when the tunnel diode is in the high voltage state. In like manner, a portion of the collector 34 current may be supplied to loads (not shown) connected at output terminal 50, without appreciable change in the output voltage $\overline{A}$.

The condition of the circuit with tunned diode 42 in the high voltage state and tunnel diode 44 in the low voltage state may be considered to be the "set" state of the flip-flop. The output voltage conditions for this state of the flip-flop are given in FIGURE 5, at time $t_a$.

Consider now the effect of applying a positive going reset pulse 76 (FIGURE 1) across the input terminals 58 at a time $t_b$. This pulse 76 raises the voltage at base electrode 26 and turns off first transistor 20. All of the current from source 40 then is supplied to second transistor 30 and switches the tunnel diode 44 to the high voltage state. Output voltage $\overline{A}$ rises from close to ground potential to approximately +0.5 volt. Tunnel diode 42 switches back to the low voltage state when the diode current is reduced below a value $I_v$ (FIGURE 2), and the output voltage A falls from approximately +0.5 volt to close to ground potential.

Figure 5:
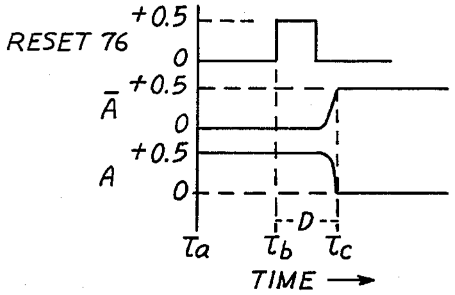
FIGURE 5 is a set of voltage waveforms useful in describing one mode of operation of the FIGURE 1 circuit.

As may be seen in FIGURE 5, the output voltages A and $\overline{A}$ do not change instantaneously upon the application of the reset pulse 76. Rather, there is a delay D equal to $t_c-t_b$, which delay is occasioned by the switching delay time of the transistors 20, 30, the output capacitances between the collector electrodes 24, 34, and ground, and other factors. This delay may be of the order of a few nanoseconds, which is relatively small compared to the switching time of a saturated transistor. Use may be made of this delay, in a manner to be described, when the FIGURE 1 circuit is employed as one stage of a shift register, counter or the like.

In the steady state condition of the FIGURE 1 circuit, the voltages A and $\overline{A}$ at the collector electrodes 24, 34, never become more positive than approximately +0.5 volt. The voltages at the base electrodes 26 and 36 never become less positive than ground potential. Accordingly, neither collector electrode is ever more than +0.5 volt more positive than the voltage at the corresponding base electrode in the steady state. This voltage differential is insufficient to saturate a silicon transistor. Accordingly, when silicon transistors are used in the circuit, the transistors never saturate and the undesirable effects of minority carrier storage are avoided, whereby the circuit may be operated at very high speed.

The tunnel diodes 42 and 44 not only provide storage for flip-flop and other applications, and prevent saturation of the transistors, but they also eliminate the need for clamp diodes at the collector electrodes 24 and 34. Also, the fact that both transistors 20, 30 conduct in the steady state means that each transistor carries only half of the current from the source means 40, whereby the heat generated in any one transistor is only about one-half as much as would be generated therein if that transistor received all of the source 40 current in the steady state.

It has been assumed that the source 40 current ideally divides equally between the two transistors 20, 30 in the steady state of the circuit. In actual practice, the source 40 current may not divide equally due to variations in the transistor parameters. A slight variation in the current division can be tolerated when the peak currents $I_p$ of the tunnel diodes 42, 44 are substantially equal and when the loading at the output terminals 48, 50 is not so great that a tunnel diode is biased near the valley region of its characteristic curve. In some applications, it has been found desirable, especially when tolerances are fairly critical, that means be provided to assure that equal currents flow through both transistors. One manner in which this may be accomplished is illustrated in FIGURE 4.

Figure 4:
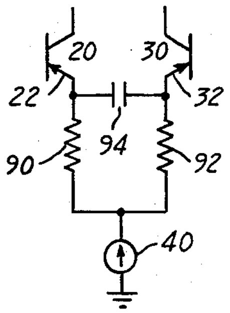
FIGURE 4 is a schematic diagram of a current balancing network.

In FIGURE 4, the emitter electrodes 22, 32 are connected to the ungrounded terminal of the current source 40 by way of resistors 90, 92, respectively, rather than being connected directly, as in the FIGURE 1 arrangement. These resistors 90 and 92 have equal values which are high enough to substantially swamp out the effects of any differences between the parameters of the transistors 20, 30. Essentially, these resistors 90 and 92 function as a current balancing network. A capacitor 94 may be connected directly between the emitter electrodes 22 and 32 to provide a low impedance path during switching transients.

Figure 6:
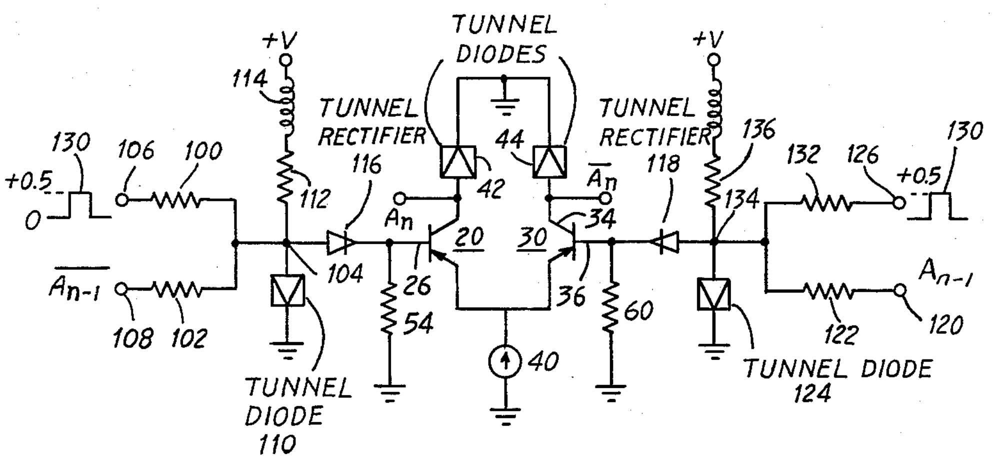
FIGURE 6 is a schematic diagram of a shift register stage which includes the circuit of FIGURE 1.

FIGURE 6 is a schematic diagram of an arrangement that includes the circuit of FIGURE 1. The FIGURE 6 circuit may be used as one stage of a shift register having a number of like stages. The input network for the first transistor 20 comprises a pair of resistors 100, 102, connected between a common junction 104 and a pair of input terminals 106, 108, respectively. A tunnel diode 110, a resistor 112 and an inductor 114 are serially connected, in the order named, between circuit ground and a source of positive bias potential, designated +V, with the anode of tunnel diode 110 being connected to the common junction 104. If desired, a tunnel rectifier 116 may be provided to couple the common junction 104 to the base electrode 26 of first transistor 20. The tunnel rectifier 116 anode is connected to junction 104 and the tunnel rectifier cathode is connected to the base electrode 26. Second transistor 30 has a similar input network. In the second transistor circuit, the tunnel diode 124 corresponds to tunnel diode 110; resistors 136, 132 and 122 respectively, to resistors 112, 100, and 102; terminals 120 and 126 to terminals 108 and 106, respectively; and tunnel rectifier 118 to tunnel rectifier 116.

Figure 7:
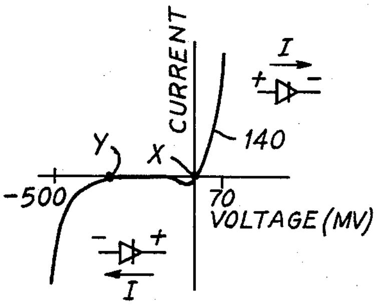
FIGURE 7 is a typical volt-ampere operating characteristic of a tunnel rectifier.

FIGURE 7 is a volt-ampere operating characteristic for a typical tunnel rectifier. The tunnel rectifier is considered to be forward biased when the anode is positive relative to the cathode. The current-voltage relationship for this condition of bias is illustrated in the first quadrant. Note that there is practically no forward conduction threshold, and that the voltage drop across the device for heavy conduction is relatively low, seventy millivolts or so. However, the device has a threshold of a few hundred millivolts in the back, or reverse, direction below which magnitude in the reverse direction little or no current flows. The reverse conduction characteristic is given in the third quadrant. Note that the voltage drop across the device may be of the order of 500 millivolts when the device is conducting heavily in the reverse direction.

In FIGURE 6, resistors 112 and 136 are chosen so that tunnel diodes 110 and 124 have monostable load lines. Bias potential +V is selected so that both tunnel diodes are biased quiescently in a low voltage condition, with the voltages at common junctions 104 and 134 close to ground potential. Each of the tunnel rectifiers then may be biased somewhere in the portion *xy* of its operating characteristic (FIGURE 7). Accordingly, in the steady state of the circuit, the tunnel rectifiers 116, 118 serve to disconnect the input networks from the associated base electrodes 26, 36, respectively, and both of the transistors 20, 30 conduct.

When the FIGURE 6 circuit is the *n*th stage of a shift register, input terminal 108 may be connected to the collector electrode of the second transistor (not shown) in the $(n-1)$th stage, and input terminal 120 may be connected at the collector electrode of the first transistor in the $(n-1)$th stage. One of these inputs is at ground potential and the other is at +0.5 volt ( and these inputs are complementary) in the steady state. Shift pulses 130 are applied concurrently at the input terminals 106 and 126, and at corresponding input terminals of the other register stages (not shown).

Input resistors 100, 102, 122 and 132 convert the input voltage levels and pulses into current levels and pulses. Those resistors are so chosen in value that an input tunnel diode 110 or 124 is triggered only when the voltages at both of the associated input terminals are at +0.5 volt. More specifically, tunnel diode 110 is triggered in response to a shift pulse 130 only if the $\overline{A_{n-1}}$ input voltage is +0.5 volt. For proper shift register operation, the $\overline{A_n}$ output voltage at collector electrode 34 then should go to +0.5 volt. Tunnel diode 124 is triggered by a shift pulse 130 if the $A_{n-1}$ input voltage is at +0.5 volt. Output voltage $A_n$ then should be +0.5 volt after the termination of the shift pulse.

Assume that tunnel diode 42 is in the high voltage state ($A_n$=+0.5 volt) and the input voltages $\overline{A_{n-1}}$ and $A_{n-1}$ are +0.5 volt and zero, respectively. Tunnel diode 110 is triggered by a shift pulse 130, and the voltage at common junction 104 rises to +0.5 volt for a period determined primarily by the inductance of inductor 114 and the capacitance of the tunnel diode 110. Tunnel rectifier 116 now becomes forward biased and the base 26 voltage rises in a positive direction, turning off first transistor 20. All of the source 40 current flows through second transistor 30 and switches tunnel diode 44 to the high voltage state. Tunnel diode 42 switches back to the low voltage state when the current in first transistor 20 falls to a low value. Output voltages $\overline{A_n}$ and $A_n$ then are +0.5 volt and zero, respectively, which is the desired output condition. Source 40 current again divides equally between the two transistors 20, 30 after input tunnel diode 110 recovers.

As mentioned previously in connection with FIGURE 5, there is a delay D between a change in input signal conditions and a change in the output voltages. Since the same shift pulse 130 is applied to all stages, this means that the input voltages $A_{n-1}$ and $\overline{A_{n-1}}$ do not change during a period D, measured from the leading edge of the shift pulse. Also, an input tunnel diode 110 or 124 can be triggered only by a shift pulse 130. Advantage is taken of the delay D, and a race condition avoided, by making the shift pulse narrower in time width than the delay D. By this means, the shift pulse 130 terminates before the outputs of the circuits change, whereby a circuit cannot assume the new state of the preceding stage. Use of the delay D avoids the need for interstage storage or delay of the type commonly employed in shift registers.

Figure 8:
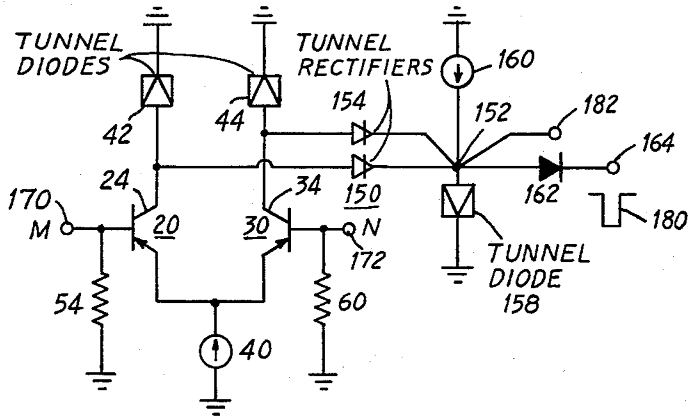
FIGURE 8 is a schematic diagram of an exclusive OR gate according to the invention.

The FIGURE 1 circuit may be used to perform other logic operations than that of a flip-flop. For example, FIGURE 8 is a schematic diagram of an "exclusive OR" gate which includes the circuit of FIGURE 1. A first tunnel rectifier 150 is connected between the collector electrode 24 of first transistor 20 and a junction point 152. A second tunnel rectifier 154 is connected between the collector electrode 34 of the other transistor 30 and the junction point 152. A tunnel diode 158 is connected between the junction point 152 (to which its anode is connected) and ground and is bistably biased by a current source 160. A conventional diode 162 is connected between the common junction 152 (to which its anode is connected) and an input terminal 164.

Let it be assumed that the inputs M and N applied at input terminals 170, 172 represent information signals from two different sources, and that each of the inputs M, N may have a value of either zero or +0.5 volt. The FIGURE 8 circuit operates to perform the exclusive OR function for these two input signals M, N in the following manner.

Let it be assumed that the input signals M and N both have the same value. That is to say, the input signals M and N are both at +0.5 volt, or both are at zero volts. Under these conditions, both of the transistors 20, 30 conduct and the source 40 current divides equally between the two transistors. A current $I/2$, which is less than the peak current $I_p$ of either tunnel diode 42, 44, flows through each transistor.

A negative reset pulse 180, applied at input terminal 164, forward biases diode 162 and has a value to (1) reset the output tunnel diode 158, and (2) bias each of the tunnel rectifiers 150 and 154 into conduction. Sufficient current is diverted through each of the tunnel rectifiers 150, 154 to reduce the current in each tunnel diode 42, 44 below the valley value $I_v$, whereby each of the tunnel diodes 42, 44 is biased in the low voltage region while the input pulse 180 is applied.

At the termination of the input pulse 180, both of the tunnel diodes 42, 44 have a current $I/2$. This current is insufficient to switch either of the tunnel diodes to the high voltage state. Accordingly, the voltage at each collector electrode 24, 34 is close to ground potential. The output tunnel diode 158 also is in the low voltage state, having been reset by the input pulse 180, and the voltage at common junction 152 is close to ground potential. Tunnel rectifiers 150 and 154 are essentially nonconducting, and no current is supplied from the transistors 20, 30 to the output tunnel diode 158. Tunnel diode 158 thus remains biased in the low voltage condition, and the output voltage at terminal 182 is essentially zero.

Consider now the condition with input M at +0.5 volt and input N at zero volts. First transistor 20 is biased in a cut-off condition, and all of the source 40 current I flows through second transistor 30. This current is greater than the peak current $I_p$ of diode 44, whereby the diode switches to the high voltage state. The voltage at the collector electrode 34 then rises to approximately +0.5 volt. Tunnel rectifier 154 is biased into conduction (first quadrant, FIGURE 7), and the current passed through tunnel rectifier 154 to common junction 152 switches the output tunnel diode 158 to the high voltage state. The output voltage at terminal 182 then rises from close to ground potential to approximately +0.5 volt.

Assume now that the input conditions reverse, that is to say, input N rises to +0.5 volt and input M falls to ground potential. Second transistor 30 turns off and all of the source 40 current I flows through first transistor 20. Negative going reset pulse 180 is applied at input terminal 164 and resets output tunnel diode 158. Tunnel rectifiers 150 and 154 are forward biased by the reset pulse 180 and both of the tunnel diodes 42 and 44 are reset to the low voltage state. At the termination of the reset pulse 180, the current I flowing through first transistor 20 switches tunnel diode 42 to the high voltage state. The voltage at collector electrode 24 rises to +0.5 volt. Tunnel rectifier 150 is biased into conduction, and sufficient current from first transistor 20 flows through tunnel rectifier 150 to switch the output tunnel diode 158 to the high voltage state. The output voltage at terminal 182 then rises to +0.5 volt.

It is clear from the above discussion that the output voltage at terminal 182 is at ground potential whenever the input signals M and N have the same value, and that the output voltage at terminal 182 has a value of +0.5 volt whenever either, but not both, of the inputs M and N is at +0.5 volt. The FIGURE 8 circuit as a whole thus functions to perform the logical exclusive OR function. The output tunnel diode 158 operates as a threshold device to perform the logical OR function for the outputs of the transistors 20, 30.

In some applications, the input signals M, N may not change at precisely the same instant. On the other hand, one of the transistors 20, 30 may respond more rapidly than the other in response to identical, concurrent changes in input signals M, N. For example, assume that both of the inputs M, N are initially at ground potential. Both transistors 20, 30 conduct and a current approximately equal to $I/2$ flows through each of the tunnel diodes 42, 44. Both of these diodes are in the low voltage state.

Assume now that the reset pulse 180 is applied and that thereafter, following the termination of the input pulse 180 both of the inputs M, N rise to +0.5 volt. Theoretically, both transistors 20, 30 should continue to conduct a current $I/2$, and neither tunnel diode 42, 44 should switch to the high voltage state. However, if the input M changes shortly before the input N changes, or if the first transistor 20 should respond faster than second transistor 30 when the inputs change concurrently, first transistor 20 may turn off temporarily during the transient. All of the source 40 current then could flow temporarily through second transistor 30 and switch the tunnel diode 44 to the high voltage state, in turn switching output tunnel diode 158. This is an undesirable situation for the reason that the output would be in error and would indicate that the inputs M and N differ.

The situation aforementioned may be avoided by proper timing of the reset pulse 180 with respect to changes in the input signals M and N. If reset pulse 180 is applied at terminal 164 during the transient period during which inputs M and N may change, sufficient transistor output current would be diverted from the tunnel diodes 42, 44 and shunted through the tunnel rectifiers 150, 154, respectively, to prevent either one of the diodes 42 or 44 from being switched to the high voltage state during the transient period. Under these conditions, a temporary flow of all of the source 40 current through one of the transistors will not produce an erroneous output indication.

Figure 9:
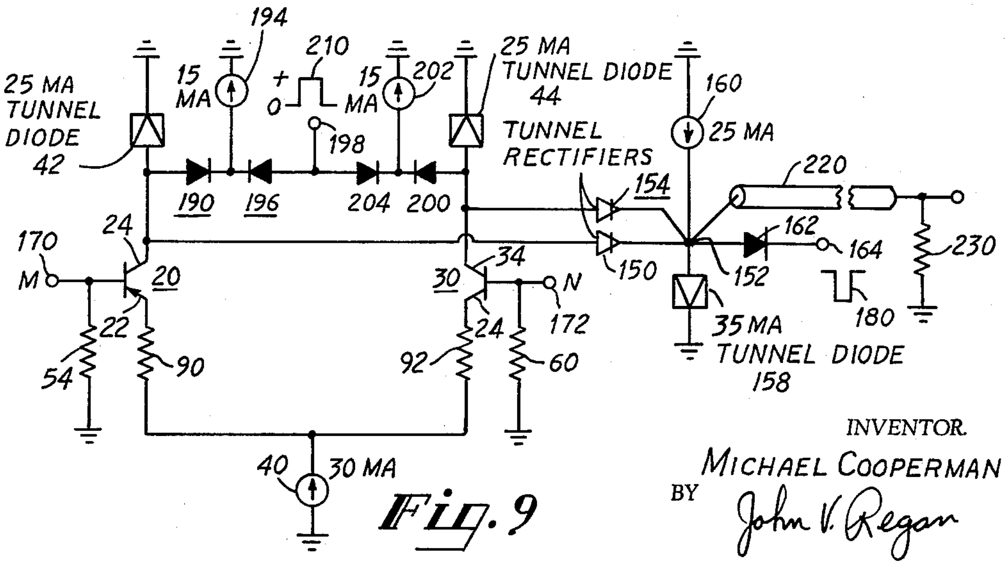
FIGURE 9 is a schematic diagram of another logic circuit arrangement according to the invention.

Another method of preventing false switching of a tunnel diode during the transient period is illustrated in FIGURE 9. In FIGURE 9, the emitter electrodes 22, 24 are shown as being connected to the current source 40 by means of resistors 90 and 92. These resistors, as previously discussed in connection with FIGURE 4, serve as a current balancing network to assure equal current flow through each transistor when the inputs M and N are equal.

The anode of tunnel diode 42 is connected to the anode of a conventional diode 190 and the cathode of this conventional diode 190 is connected to the ungrounded terminal of a source 194 of substantially constant current. The cathode of a second diode 196 is connected to the ungrounded terminal of the current source 194 and its anode to an input terminal 198. The anode of the other tunnel diode 44 is connected to the anode of a diode 200 the cathode of which is connected to the ungrounded terminal of a current source 202, and a diode 204 has its cathode connected to the current source 202 and its anode to the input terminal 198. The current sources 194 and 202 supply current to the circuit which is of opposite polarity to the current supplied by the source 40 in the emitter circuits of the transistors.

Let it be assumed that the tunnel diodes 42, 44 are 25 milliampere peak diodes, that is $I_p$=25 milliamperes. Assume further that the current source 40 supplies 30 milliamperes of current and that each of the other sources 194 and 202 receives 15 milliamperes. With the voltage at input terminal 198 at ground potential, and with both tunnel diodes 42, 44 in the low voltage state, about 10 milliamperes of current flow from each collector electrode 24, 34 through the associated diodes 190 and 200 to the current sources 194 and 202, respectively. Five milliamperes of current may flow through each of the diodes 196 and 204 from the input terminal 198 to the current sources 194 and 202.

Assume now that inputs M and N both change from zero volts to +0.5 volt, but that input M changes slightly before input N changes timewise. First transistor 20 turns off temporarily and the 30 milliamperes of current from source 40 are steered temporarily through second transistor 30. Because of the 10 milliamperes of current drawn through diode 200 to the current source 202, only 20 milliamperes of current flow through the tunnel diode 44. This current is insufficient to switch the tunnel diode 44. Once the transient condition has ended, both of the transistors 20 and 30 conduct equal amounts of current, and about 5 milliamperes flow through each of the tunnel diodes 42, 44. The output tunnel diode 158 does not become switched to the high voltage state because neither of the other tunnel diodes 42, 44 has been switched. Thus the network connected between the tunnel diodes 42, 44 prevents an erroneous output condition without the necessity of applying a reset pulse 180 during the transient period of input change.

Assume now that the input N remains at +0.5 volt and that input M changes to ground potential. Second transistor 30 turns off and all of the current from a source 40 flows through first transistor 20. Twenty milliamperes of this current flow through tunnel diode 42, and ten milliamperes flow through diode 190 to the current source 194. An "interrogate" pulse 210, applied at input terminal 198, raises the voltage at terminal 198 and causes all of the current for sources 194 and 202 to flow through the diodes 196 and 204, respectively. Diodes 190 and 200 are reverse biased while the interrogate pulse 210 is applied. The entire thirty milliamperes of collector 24 current then flow through the tunnel diode 42, switching that diode to the high voltage state and raising the collector 24 voltage to +0.5 volt. Tunnel rectifier 150 becomes forward biased, and current through the rectifier 150 switches tunnel diode 158 to the high voltage state.

Once the interrogate pulse 210 terminates, ten milliamperes of current again flow through the didoe 190 to the source 194. Actually, a somewhat greater amount of current may flow because of the slightly positive voltage at the collector electrode 24. If the input signals M, N are still present at this time, first transistor 20 receives all of the current from the source 40. Twenty milliamperes of current flow through the tunnel diode 42, and the tunnel diode 42 remains in the high voltage state. On the other hand, if the inputs M and N are signals rather than levels, and the signals have terminated, then each of the transistors 20 and 30 conducts fifteen milliamperes of current. In that case, only five milliamperes of collector 24 current flow through the tunnel diode 42 after the interrogate pulse 210 terminates. This current may or may not be sufficient to maintain the tunnel diode 42 in the high voltage state. However, this is immaterial inasmuch as the output tunnel diode 158 has already been switched to the high voltage state.

The output tunnel diode 158 is reset in response to a reset pulse 180 applied at terminal 164. This reset pulse 180 may also reset the tunnel diode 42 to the low voltage state. Neither tunnel diode 42 nor 44 may thereafter be switched to the high voltage state in response to a change in input signals M, N until the next interrogate pulse 210 is applied at terminal 198.

If the inputs M and N are levels rather than pulses, advantage obtains in some applications if the reset pulse 180 is made small enough so as not to reset a tunnel diode 42 or 44 which is receiving twenty milliamperes of current from the source 40. One such application is that wherein the FIGURE 9 circuit forms one stage of a shift register type device arranged to generate pseudo-random pulse sequences, or wherein the register is arranged as frequency spectrum code generator. In such an application, each of the inputs M and N may come from a different one of the other stages in the generator. If M is at +0.5 volt and N is at zero volts, the thirty milliamperes of source 40 current flow through second transistor 30. Twenty milliamperes flow through tunnel diode 44, and ten milliamperes flow through diode 200 to the source 202. When an interrogate pulse 210 is applied, diode 200 becomes reverse biased and the thirty milliamperes of collector 34 current flow through the tunnel diode 44, switching the tunnel diode to the high voltage state. In turn output tunnel diode 158 is switched to the high voltage state by current supplied through tunnel rectifier 154.

Assume that at the beginning of the next pulse period, when reset pulse 180 is applied, input levels M and N remain unchanged. Second transistor 30 conducts to receive all of the source 40 current, and twenty milliamperes flow through tunnel diode 44. If the reset pulse 180 is insufficient in amplitude to reduce the diode 44 current below the valley value $I_v$ thereof, tunnel diode 44 will remain in the high voltage state. This causes no difficulty, however, since the input levels M and N are such as to demand that tunnel diode 44 be in the high voltage state. Accordingly, upon termination of the reset pulse 180, current flow through tunnel rectifier 154 again switches output tunnel diode 158 to the high voltage state.

If the input levels M and N change at the beginning of the next cycle, when reset pulse 180 is applied, all of the current will flow from source 40 through first transistor 20. The reset pulse now is effective to switch the tunnel diode 44 to the low voltage state, although this is not necessary since the diode 44 will reset automatically when the second transistor 30 cuts off.

Consider now the effect of the reset pulse 180 when second transistor 30 is conducting, tunnel diode 44 is in the high voltage state, and the input level M changes to zero volts slightly prior to the application of the reset pulse 180. Both transistors 20 and 30 now conduct fifteen milliamperes, ten of which flow through each of the diodes 190 and 200 and five milliamperes of which flow through each of the tunnel diodes 42 and 44. When reset pulse 180 is applied, a portion of the diode 44 current is diverted through the tunnel rectifier 154 to input terminal 164, and this diverted current is sufficient to switch the tunnel diode 44 to the low voltage state. When the reset pulse 180 terminates and an interrogate pulse 210 is applied at terminal 198, the tunnel diodes 42, 44 each receive fifteen milliamperes of current. This current is insufficient to switch either tunnel diode, whereby they both remain in the low voltage state. Output tunnel diode 158 also remains in the low voltage state.

The output of tunnel diode 158 may be supplied by way of a transmission line 220 to the input terminal at the base of a transistor in another, similar stage (not shown). A resistor 230 is connected between the output of the transmission line and ground. This resistor may be the base bias resistor corresponding to either of the resistors 54 or 60 in the FIGURE 9 circuit. In a similar manner, the inputs M and N may be supplied to the terminals 170, 172, respectively, by way of transmission lines (not shown). Resistors 54 and 60 may be chosen in value to provide proper termination for the transmission lines to prevent reflections. Also, resistors 54 and 60, like the resistor 230, may serve as loads on the respective output tunnel diodes to make it easier to reset the respective tunnel diodes in response to the reset pulse 180.

Another method of operating the FIGURE 9 circuit is believed worthy of mention. This circuit may be used as one stage of a shift register of conventional type by connecting the input M to a point of fixed potential, zero volts for example, and by connecting the input N to the output of the output tunnel diode in the next preceding stage. As is known, a shift register operates, in response to a shift pulse, to advance the information in the register one stage at a time. Thus, if the output tunnel diode in the preceding stage is in the high voltage condition, the output tunnel diode of the FIGURE 9 circuit should be in the high voltage state after the shift pulse is applied. Likewise, if the tunnel diode at the output of the preceding stage is in the low voltage state, the tunnel diode 158 should be in the low voltage state after the shift pulse is applied. In FIGURE 9, the pulse 210, applied at terminal 198, is the shift pulse.

Let it be assumed that the output of the preceding stage is at +0.5 volt. Second transistor 30 then is nonconducting and the thirty milliamperes of current flow through first transistor 20. When the shift pulse 210 is applied, diode 190 becomes reverse biased and the thirty milliamperes flow through tunnel diode 42, switching this diode to the high voltage state. A reset pulse 180 is applied to reset the output tunnel diodes of all of the stages. This reset pulse, however, is not of sufficient amplitude to reset the tunnel diode 42. Accordingly, when the reset pulse 180 terminates, current flows through the tunnel rectifier 150, from collector electrode 24, and switches the tunnel diode 158 to the high voltage state. This is the same state as the output tunnel diode of the previous stage had prior to the shift operation.

If now the input N is at zero volts, indicating that the output tunnel diode of the preceding stage is reset, both of the transistors 20 and 30 conduct fifteen milliamperes of current. Tunnel diode 42, however, is still in the high voltage state from the previous input condition. When shift pulse 210 is applied, each of the tunnel diodes receives fifteen milliamperes of current, but tunnel diode 44 does not switch. The reset pulse 180 resets the output tunnel diode 158, and draws sufficient current through the tunnel rectifier 150 to switch the tunnel diode 42 to the low voltage state. At the termination of the reset pulse 180, both tunnel diodes 42 and 44 are in the low voltage state, no current flows through either tunnel rectifier 150, 154 and output tunnel diode 158 remains in the low voltage state.

In order for the FIGURE 9 circuit to function as just described, the reset pulse 180 should draw about fifteen milliamperes of current through each tunnel rectifier. This current is sufficient to reset a tunnel diode 42 or 44 when both of the transistors 20, 30 conduct, but is not sufficient to reset a tunnel diode which is connected to a transistor receiving all of the current from the source 40.

The FIGURE 9 circuit also may be operated by applying reset pulse 180 prior to the application of the interrogate pulse 210. This feature adds flexibility to the circuit insofar as pulse spacing is concerned.

Although the circuits of FIGURES 1, 6, 8 and 9 have been described and illustrated as employing PNP type transistors, it will be understood that NPN type transistors also could be used. In the latter case, the connections to the various diodes, rectifiers, current sources and batteries should be reversed. Also, the inputs to the circuits should be either zero volts or −0.5 volt.

What is claimed is:

1. The combination comprising:
a pair of amplifying devices, each device having input and output electrodes defining a current carrying path, and a control electrode;
a current supply of I milliamperes;
a pair of negative resistance devices each having a volt-ampere characteristic defined by first and second regions of positive resistance separated by a region of negative resistance, each device having a peak current which is less than I and greater than $I/2$;
means connecting the current carrying path of each amplifying device in series with a different negative resistance device across said current supply;
a pair of input terminals, each being coupled to a different control electrode; and
means coupled to the control electrodes for biasing both amplifying devices into conduction in the absence of input signals applied at either one of the input terminals.

2. The combination comprising:
a pair of transistors each having an emitter electrode, a collector electrode and a base electrode;
a source of substantially constant current I having two terminals, one terminal of said source being connected to the emitter electrode of each transistor;
a pair of tunnel diodes each having a peak current which is less than I and greater than $I/2$;
means connecting each of said tunnel diodes between a different collector electrode and a second terminal of said current source; and
means connected between each emitter electrode and the corresponding base electrode for quiescently biasing each of the transistors into substantially equal conduction.

3. The combination as claimed in claim 2, wherein said tunnel diodes are poled in a direction to be forward biased by the current supplied by the current source.

4. The combination comprising:
a pair of transistors of like conductivity type, each transistor having a collector electrode, an emitter electrode, and a base electrode;
substantially constant current supply means having one terminal connected to each said emitter electrode;
a pair of tunnel diodes each having a peak current which is less than the output, and greater than one-half the output, of said current supply means;
each of said tunnel diodes being connected between a different said collector electrode and another terminal of said current supply means;
means connected to each said base electrode for supplying forward base current to each transistor in the quiescent condition; and
means selectively applying input signals at the base electrodes of the transistors.

5. A flip-flop comprising:
first and second amplifying devices each having input and output electrodes defining a current carrying path, and a control electrode;
current supply means;
a pair of negative resistance devices each having a volt-ampere characteristic defined by first and second regions of positive resistance at relatively low and relatively high voltage, respectively, and a region of negative resistance joining the two regions of positive resistance, each negative resistance device having a peak current which is less than the current supplied by the current supply means and greater than one-half of said current;
means connecting the current carrying path of each amplifying device in series with a different negative resistance device across said current supply means;
first and second input terminals respectively coupled to the control electrodes of the first and second amplifying devices;
means coupled to the control electrodes for biasing each of the amplifying devices into conduction in the absence of input signals applied at either one of said input terminals;
means for applying reset pulses to the first input terminal, said pulses having an amplitude to turn off one of the first and second amplifying devices; and
means for applying "set" pulses at the second input terminal, said set pulses having an amplitude to turn off the other one of said first and second amplifying devices.

6. The combination comprising:
first and second transistors each having a control electrode, an emitter electrode and collector electrode;
a source of substantially constant current I having a first terminal connected to each said emitter electrode;
a pair of tunnel diodes each being connected between the collector electrode of a different transistor and a second terminal of said current source, each tunnel diode having a peak current which is greater than I and less than $I/2$;
a two input OR gate;
means coupling each said collector electrode to a different input of said OR gate; and
means for applying input signals individually and selectively at the control electrodes of said transistors.

7. The combination comprising:
first and second transistors each having a control electrode, an emitter electrode and collector electrode;
a source of substantially constant current having a first terminal connected to each said emitter electrode;
a pair of tunnel diodes each being connected between the collector electrode of a different transistor and a second terminal of said current source, each tunnel diode having a peak current which is less than the current supplied by said current source and greater than one-half of said current;
a third tunnel diode biased for bistable operation;
means coupling each said collector electrode to said third tunnel diode; and
means for applying input signals individually and selectively at the control electrodes of said transistors.

8. The combination as claimed in claim 7 wherein each tunnel diode has a valley current value $I_v$, and means coupled to each said tunnel diode and being selectively operable to reduce the current in each said tunnel diode below its valley value of current.

9. The combination comprising:
- first and second transistors each having a base electrode, an emitter electrode and a collector electrode;
- a source of substantially constant current I of a first polarity having one terminal connected to each said emitter electrode;
- first and second tunnel diodes each having a peak current $I_p$ which is less than I and greater than $I/2$;
- means connecting each of said first and second tunnel diodes between the collector electrode of a different transistor and a second terminal of said current source;
- second and third sources of substantially constant current of a second polarity opposite said first polarity, each of said second and third sources supplying a current greater than $I-I_p$;
- first and second unidirectional conducting devices coupling said second and third current sources to the collector electrodes of the first and second transistors, respectively;
- first and second sources of input signals each being coupled to a different said control electrode; and
- means selectively operable to reverse bias said unidirectional conducting devices.

10. The combination as claimed in claim 9 including a bistable device coupled to the collector electrodes of the first and second transistors, and means selectively operable to reset said bistable device.

References Cited by the Examiner

UNITED STATES PATENTS

| | | | |
|---|---|---|---|
| 3,076,105 | 1/1963 | Robinson et al. | 307—88.5 |
| 3,102,208 | 8/1963 | Reach | 307—88.5 |
| 3,102,209 | 8/1963 | Pressman | 307—88.5 |
| 3,127,525 | 3/1964 | Robinovici | 307—88.5 |
| 3,144,565 | 8/1964 | Coffey | 307—88.5 |
| 3,161,781 | 12/1964 | Spiegal | 307—88.5 |

OTHER REFERENCES

Rymmaszewski, High Speed Logic Circuit, IBM Technical Disclosure Bulletin, vol. 4, No. 9, February 1962.

Turnbull, Transistor-Tunnel Diode Inverter, IBM Technical Disclosure Bulletin, vol. 4, No. 2, July 1961.

Lo, Transistor-Tunnel Diode Logic Circuit, RCA Technical Note No. 502, March 1962.

JOHN W. HUCKERT, *Primary Examiner.*

ARTHUR GAUSS, *Examiner.*

I. C. EDELL, *Assistant Examiner.*